US012463347B1

(12) United States Patent
Leung et al.

(10) Patent No.: US 12,463,347 B1
(45) Date of Patent: Nov. 4, 2025

(54) ALL-DIELECTRIC REFLECTARRAY ANTENNA

(71) Applicant: City University of Hong Kong, Kowloon (HK)

(72) Inventors: Kwok Wa Leung, Shatin (HK); Ting Li, Changsha (CN)

(73) Assignee: CITY UNIVERSITY OF HONG KONG, Kowloon (HK)

(*) Notice: Subject to any disclaimer, the term of this patent is extended or adjusted under 35 U.S.C. 154(b) by 76 days.

(21) Appl. No.: 18/653,010

(22) Filed: May 2, 2024

(51) Int. Cl.
*H01Q 15/14* (2006.01)

(52) U.S. Cl.
CPC ........... *H01Q 15/14* (2013.01); *H01Q 15/141* (2013.01)

(58) Field of Classification Search
CPC ............................. H01Q 15/14; H01Q 15/141
See application file for complete search history.

(56) References Cited

U.S. PATENT DOCUMENTS 9,739,918 B2 * 8/2017 Arbabi .................. G02B 5/021
10,263,342 B2 4/2019 Hand
10,978,810 B2 4/2021 Lee
11,201,412 B2 12/2021 David
11,575,203 B1 * 2/2023 Leung ................... H01Q 5/357

FOREIGN PATENT DOCUMENTS

WO WO-2016197823 A1 * 12/2016 .............. H01Q 1/38

OTHER PUBLICATIONS

S. A. Bokhari, J.-F. Zurcher, J. R. Mosig, and F. E. Gardiol, "A Small Microistrip Patch Antenna with a Convenient Tuning" IEEE Trans. on Antennas and Propagation, vol. 44, No. 11, Nov. 1996, pp. 1521-1528, 8 pages.

Lei Zhu, Rong Fu, and Ke-Li Wu, "A novel broadband microstrip-fed wide slot antenna with double rejection zeros," IEEE Antennas Wireless Propagation Letters, vol. 2, 2003,, pp. 194-196, doi: 10.1109/LAWP.2003.819689, 3 pages.

K. W. Leung, K. M. Luk, K. Y. A. Lai, and D. Lin, "Theory and experiment of a coaxial probe fed hemispherical dielectric resonator antenna," IEEE Trans. on Antennas and Propagation, vol. 41, No. 10, pp. 1390-1398, Oct. 1993, doi: 10.1109/8.247779, 9 pages.

(Continued)

*Primary Examiner* — Seung H Lee
(74) *Attorney, Agent, or Firm* — Francis J. Maguire; WARE FRESSOLA MAGUIRE & BARBER LLP

(57) ABSTRACT

An antenna includes a supporting layer and a reflection element disposed on the supporting layer configured to reflect an incident wave with a respective reflection phase, the reflection element extending perpendicularly from the supporting layer at a height configured to achieve the respective reflection phase, and both the supporting layer and the reflection element being formed with an all-dielectric material. The antenna is not susceptible to metallic corrosion and has flexible design freedom. It is in a simple and compact structure for providing complete reflection and phase adjustment simultaneously. The simple structure of the antenna enables it to be manufactured in an efficient and cost-effective manner.

24 Claims, 11 Drawing Sheets

(56) References Cited

OTHER PUBLICATIONS

R. L. Haupt, "Antenna Arrays: A Computational Approach," Hoboken, NJ, USA: John Wiley Sons, Inc., 2010. doi: 10.1002/9780470937464, Title Pags and Table of Contents, 9 pages.
R. Winston Revie & Herbert H. Uhlig, "Corrosion and Corrosion Control: An Introduction to Corrosion Science and Engineering," Fourth Edition, John Wiley & Sons, 2008, Title Pages and Table of Contents, 15 pages.
Dieter Stoye & Werner Freitag (Editors), "Paints, coatings and solvents," John Wiley & Sons, 2008, Title Pages and Table of Contents, 16 pages.
R. Shavit, "Radome electromagnetic theory and design," Hoboken, NJ: Wiley / IEEE Press, 2018, Title Pages and Table of Contents, 7 pages.
Ze-Jun.Zhang, M.-B. Zhou, T. Sun, X. Wu, and X.-P. Zhang, "Influences of Ag and Zn contents on interfacial microstructure and corrosion behavior of Sn—Zn—Ag/6061Al joints in antenna module packages," in 2019 20th International Conference on Electronic Packaging Technology(ICEPT), Aug. 2019, pp. 1-4. doi: 10.1109/ICEPT47577.2019.245317, 4 pages.
J. D. Plunkett, "NASA Contributions to the technology of inorganic coatings," Title Pages and Table of Contents, Denver Research Inst Co, 1964. Accessed: Apr. 27, 2021. [Online]. Available: https://collections.uakron.edu/digital/collection/p15960coll1/id/18871/, 7 pages.
K. E. Chong et al., "Efficient Polarization-Insensitive Complex Wavefront Control Using Huygens Metasurfaces Based on Dielectric Resonant Meta-atoms," ACS Photonics, vol. 3, No. 4, pp. 514-519, Apr. 2016, doi: 10.1021/acsphotonics.5b00678, 19 pages.
J. Sautter et al., "Active Tuning of All-Dielectric Metasurfaces," ACS Nano, vol. 9, No. 4, pp. 4308-4315, Apr. 2015, doi: 10.1021/acsnano.5b00723, 8 pages.
W. Liu and A. E. Miroshnichenko, "Beam Steering with Dielectric Metalattices," ACS Photonics, vol. 5, No. 5, pp. 1733-1741, May 2018, doi: 10.1021/acsphotonics.7b01217, 31 pages.
A. Cordaro, H. Kwon, D. Sounas, A. F. Koenderink, A. Alu, and A. Polman, "High-Index Dielectric Metasurfaces Performing Mathematical Operations," Nano Lett., vol. 19, No. 12, pp. 8418-8423, Dec. 2019, doi: 10.1021/acs.nanolett.9b02477, 18 pages.
H. Ma and W. Zhang, "Genetically optimized all-dielectric metasurfaces for visible perfect broadband reflectors," Optik, vol. 182, pp. 233-240, Apr. 2019, doi: 10.1016/j.ijleo.2019.01.023, 8 pages.
J. H. Barton, C. R. Garcia, E. A. Berry, R. G. May, D. T. Gray, and R. C. Rumpf, "All-Dielectric Frequency Selective Surface for High Power Microwaves," IEEE Trans. Antennas Propag., vol. 62, No. 7, pp. 3652-3656, Jul. 2014, doi: 10.1109/TAP.2014.2320525, 5 pages.
F. J. Garcia-Vidal, L. Martin-Moreno, and J. B. Pendry, "Surfaces with holes in them: new plasmonic metamaterials," J. Opt. Pure Appl. Opt., vol. 7, No. 2, pp. S97-S101, Feb. 2005, doi: 10.1088/1464-4258/7/2/013, 5 pages.
J. B. Pendry, A. J. Holden, W. J. Stewart, and I. Youngs, "Extremely Low Frequency Plasmons in Metallic Mesostructures," Phys. Rev. Lett., vol. 76, No. 25, pp. 4773-4776, Jun. 1996, doi: 10.1103/PhysRevLett.76.4773, 4 pages.
S. Hannan, M. T. Islam, N. M. Sahar, K. Mat, M. E. H. Chowdhury, and H. Rmili, "Modified-Segmented Split-Ring Based Polarization and Angle-Insensitive Multi-Band Metamaterial Absorber for X, Ku and K Band Applications," IEEE Access, vol. 8, pp. 144051-144063, 2020, doi: 10.1109/ACCESS.2020.3013011, 13 pages.
Q. Zhao, J. Zhou, F. Zhang, and D. Lippens, "Mie resonance-based dielectric metamaterials," Mater. Today, vol. 12, No. 12, pp. 60-69, Dec. 2009, doi: 10.1016/S1369-7021(09)70318-9, 10 pages.
A. Monti, A. Alu, A. Toscano, and F. Bilotti, "Surface Impedance Modeling of All-Dielectric Metasurfaces," IEEE Trans. Antennas Propag., vol. 68, No. 3, pp. 1799-1811, Mar. 2020, doi: 10.1109/TAP.2019.2951521, 13 pages.
C. L. Holloway, E. F. Kuester, J. Baker-Jarvis, and P. Kabos, "A double negative (DNG) composite medium composed of magnetodielectric spherical particles embedded in a matrix," IEEE Trans. Antennas Propag., vol. 51, No. 10, pp. 2596-2603, Oct. 2003, doi: 10.1109/TAP.2003.817563, 8 pages.
Z. Lin, Z. Ba, and X. Wang, "Broadband High-Efficiency Electromagnetic Orbital Angular Momentum Beam Generation Based on a Dielectric Metasurface," IEEE Photonics J., vol. 12, No. 3, pp. 1-11, Jun. 2020, doi: 10.1109/JPHOT.2020.2991114, 11 pages.
D.-C. Wang, S. Sun, Z. Feng, W. Tan, and C.-W. Qiu, "Multipolar-interference-assisted terahertz waveplates via all-dielectric metamaterials," Appl. Phys. Lett., vol. 113, No. 20, p. 201103, Nov. 2018, doi: 10.1063/1.5063603, 6 pages.
A. Massaccesi et al., "3D-Printable Dielectric Transmitarray With Enhanced Bandwidth at Millimeter-Waves," IEEE Access, vol. 6, pp. 46407-46418, 2018, doi: 10.1109/ACCESS.2018.2865353, 12 pages.
V. M. Pepino, A. F. da Mota, A. Martins, and B.-H. V. Borges, "3-D-Printed Dielectric Metasurfaces for Antenna Gain Improvement in the Ka-Band," IEEE Antennas Wirel. Propag. Lett., vol. 17, No. 11, pp. 2133-2136, Nov. 2018, doi: 10.1109/LAWP.2018.2860521, 5 pages.
L. Zou et al., "Dielectric resonator nanoantennas at visible frequencies," Opt. Express, vol. 21, No. 1, p. 1344, Jan. 2013, doi: 10.1364/OE.21.001344, 9 pages.
Y.-X. Sun and K. W. Leung, "Millimeter-Wave Substrate-Based Dielectric Reflectarray," IEEE Antennas Wirel. Propag. Lett., vol. 17, No. 12, pp. 2329-2333, Dec. 2018, doi: 10.1109/LAWP.2018.2874082, 9 pages.
J. Zhu, Y. Yang, D. McGloin, S. Liao, and Q. Xue, "3-D Printed All-Dielectric Dual-Band Broadband Reflectarray with a Large Frequency-Ratio," IEEE Trans. Antennas Propag., pp. 1-1, 2021, doi: 10.1109/TAP.2021.3076528, 6 pages.
[X. Gui, X. Jing, and Z. Hong, "Ultrabroadband Perfect Reflectors by All-Dielectric Single-Layer Super Cell Metamaterial," IEEE Photonics Technol. Lett., vol. 30, No. 10, pp. 923-926, May 2018, doi: 10.1109/LPT.2018.2825426, 4 pages.
K. Narayanasamy, G. N. Alsath Mohammed, and K. Savarimuthu, "Design and analysis of single layer Ku/K band integrated element reflectarray antenna", Int. J. Microw. Wireless Technol., pp. 1-10, Mar. 2023, 11 pages.

* cited by examiner

ALL-DIELECTRIC REFLECTARRAY ANTENNA

TECHNICAL FIELD

The present invention refers to an antenna. In particular, the present invention refers to an all-dielectric metamaterial based antenna.

BACKGROUND OF THE INVENTION

In the past century, with the rapid development of the communications industry, antenna research has become an important area of concern. There are many types of antennas, namely the patch antenna, the slot antenna, the dielectric resonant antenna (DRA), and different kinds of antenna arrays. Among these antennas, almost all of them contain metal materials, whether the metal materials are made into radiators or ground. Metal materials are prone to corrosion in outdoor environments, which will damage the mechanical and electrical performance of the antennas, and may even affect the quality of wireless communication.

To overcome these problems, two main methods have been used: coatings and radomes. Both metallic coatings and inorganic coatings can effectively isolate the metal from the external environment, and thus slowing down metal corrosion. However, these solutions may not be effective in harsh environments, such as areas near the equator with long-term exposure to high temperatures and strong ultraviolet rays, which can accelerate metal corrosion of metallic coatings. In the Arctic Circle, extremely low temperatures can cause inorganic coatings to fail. Similarly, in desert environments with large temperature differences between day and night, thermal expansion and contraction can accelerate the corrosion and deformation of coatings. This can also occur on islands and ships with high temperatures, high humidity, and high levels of salt fog. While radomes are an alternative to coatings, they are also unsuitable for harsh environments. In summary, while these two methods may slow down metal corrosion, they cannot prevent it. Additionally, implementing these solutions can increase the cost and complexity of antenna systems. On the other hand, all-dielectric antennas do not encounter metal corrosion at all. Therefore, without adding to the cost and complexity, all-dielectric antennas are more suitable for outdoor environments, particularly harsh ones.

Dielectric reflectarrays have also been studied in recent years. However, many of the reflectarrays require a metal ground plane for optimal reflection. Alternatively, some studies suggest using an all-dielectric metamaterial (ADM) instead of a metal ground plane. Nevertheless, the previous design of an ADM-based antenna typically involves four or more layers to achieve reflection at each frequency band, resulting in a much higher profile.

SUMMARY OF THE INVENTION

In a first aspect, there is provided an antenna, comprising: (i) a supporting layer, and (ii) a reflection element disposed on the supporting layer, configured to reflect an incident wave with a respective reflection phase, wherein the reflection element extends perpendicularly from the supporting layer at a height configured to achieve the respective reflection phase, and wherein both the supporting layer and the reflection element is formed with an all-dielectric material.

In some embodiments, the supporting layer has a first dielectric constant and the reflection element has a second dielectric constant, and wherein the second dielectric constant is higher than the first dielectric constant.

In some embodiments, the reflection element is a single-layer structure.

In some embodiments, the reflection element further comprising: (i) a central portion and (ii) two arm portions attached to either side of the central portion, wherein the arm portions form an angle of 180° with respect to each other.

In some embodiments, the central portion has a first height and each of the arm portions has a second height, and wherein the second height is less than half of the first height.

In some embodiments, the first height ranges between 3 mm and 7 mm.

In some embodiments, the second height is 2.5 mm.

In some embodiments, the central portion is aligned with the supporting layer on a same central axis.

In some embodiments, each of the arm portions extends from the central portion along a direction of an electric field.

In some embodiments, the central portion is cylindrical in shape.

In some embodiments, each of the arm portions has a width less than a diameter of the central portion.

In some embodiments, the central portion has a radius of 2.15 mm.

In some embodiments, the supporting layer is hexagonal in shape.

In some embodiments, each of the arm portions is aligned with an edge of the supporting layer.

In some embodiments, each of the arm portions has a width about a third of the edge of the supporting layer.

In some embodiments, the width of each of the arm portions is 1 mm.

In some embodiments, the supporting layer has a diagonal length of 10 mm.

In some embodiments, the antenna is symmetrical about a centre of rotation.

In some embodiments, the antenna is configured to operate within a reflection bandwidth defined by a separation between a magnetic wave resonant frequency and an electromagnetic wave resonant frequency.

In some embodiments, the reflection bandwidth is determined by a width of the reflection element.

In some embodiments, the reflection bandwidth is determined by the height of the reflection element.

In some embodiments, the antenna is formed by three-dimensional printing technology.

In some embodiments, the antenna is configured to operate in Ka frequency band or THz frequency band.

In some embodiments, the antenna comprising a plurality of reflection elements arranged in an array on the supporting layer, wherein the plurality of reflection elements are configured to collectively form a predetermined phase distribution profile that reflects the incident wave in a predetermined direction.

Exemplary embodiments of the present invention provide an antenna which is not susceptible to metallic corrosion, and has flexible design freedom since the material and shape thereof can be chosen arbitrarily, provided that it enables interaction between electromagnetic waves and dielectric particles to achieve Mie resonances. Further, a simple and compact antenna structure that is efficient and cost-effective to manufacture can be achieved with just a single layer of reflection elements, which provides complete reflection and phase adjustment simultaneously.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn in scale and any reference to dimensions in the drawings or the following description is specific to the embodiments disclosed.

DETAILED DESCRIPTION OF THE EMBODIMENTS

A majority of the high-gain antennas available on the market use metal material, which are susceptible to corrosion in outdoor environments. Corrosion can harm the mechanical and electrical performance of antennas, and may even impact wireless communication quality. Antennas made of metallic metamaterials typically rely on LC resonant circuits. However, traditional metallic metamaterials are inflexible in terms of unit shape, which can limit their application.

The existing all-dielectric reflectarray typically requires multiple dielectric layers to achieve full reflection and multiple dielectric particles for phase adjustment. Therefore, the structure of such antennas is rather complex.

In order to at least alleviate some of the deficiencies of the prior art, the present inventors have developed an antenna which does not contain any metallic materials, while maintaining a simple and compact antenna structure for efficient and cost-effective manufacturing.

More particularly, the present invention provides an all-dielectric metamaterial (ADM)-based reflectarray antenna to achieve full reflection and phase adjustment simultaneously. The antenna of the present invention only includes a single layer of reflection elements, and is operable in Ka-band. The antenna can serve as a high-gain antenna, making it useful for satellite communication, radar, remote sensing, and 5G antennas. It is particularly suitable for outdoor and harsh environments.

In recent years, extensive research has been conducted on the use of all-dielectric metamaterials (ADMs) as antenna materials. Unlike traditional metallic metamaterials, which rely on the shape of each unit element, ADMs are utilised based on Mie resonances. These resonances are achieved through the interaction between electromagnetic waves and dielectric particles, resulting in electric or magnetic resonances. The separation between the electric and magnetic resonances enable a wide reflective window for efficient operation of the antenna.

Figure 1A:
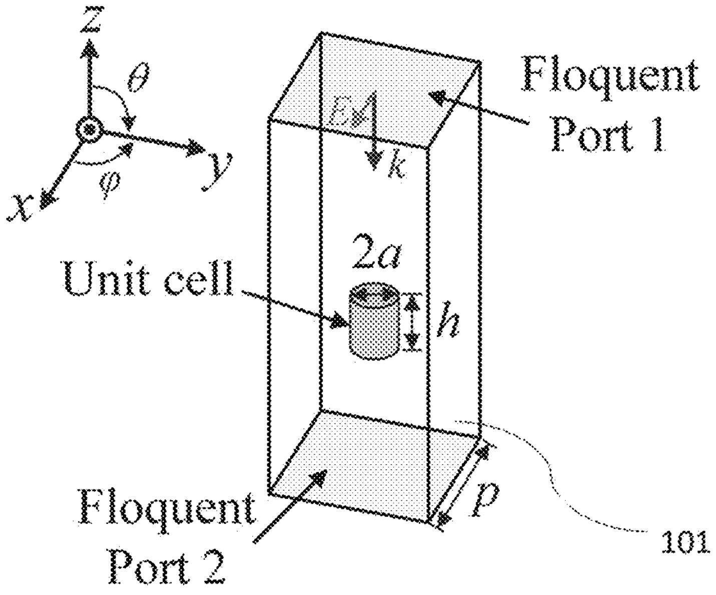
FIG. 1*a* shows a Mie Resonance simulation model of a reflection element of an antenna according to an embodiment of the present invention.

For demonstration of the Mie Resonance, a computational simulation is performed with ANSYS HFSS. As shown in the simulation model of FIG. 1*a*, a cylindrical unit 101 is designed by HFSS, which represents a first embodiment of a reflection element 101 of an antenna according to the present invention. With the utilisation of a Floquet model with an infinite period boundary condition, the required reflection amplitude and phase response of the reflection element 101 can be obtained.

In the simulation, the dielectric constant of the reflection element 101 is set as 12, and the side length p of the square period is 8 mm. The radius a and height h of the cylinder are set as 2.15 mm and 1.9 mm, respectively.

Figure 1B:
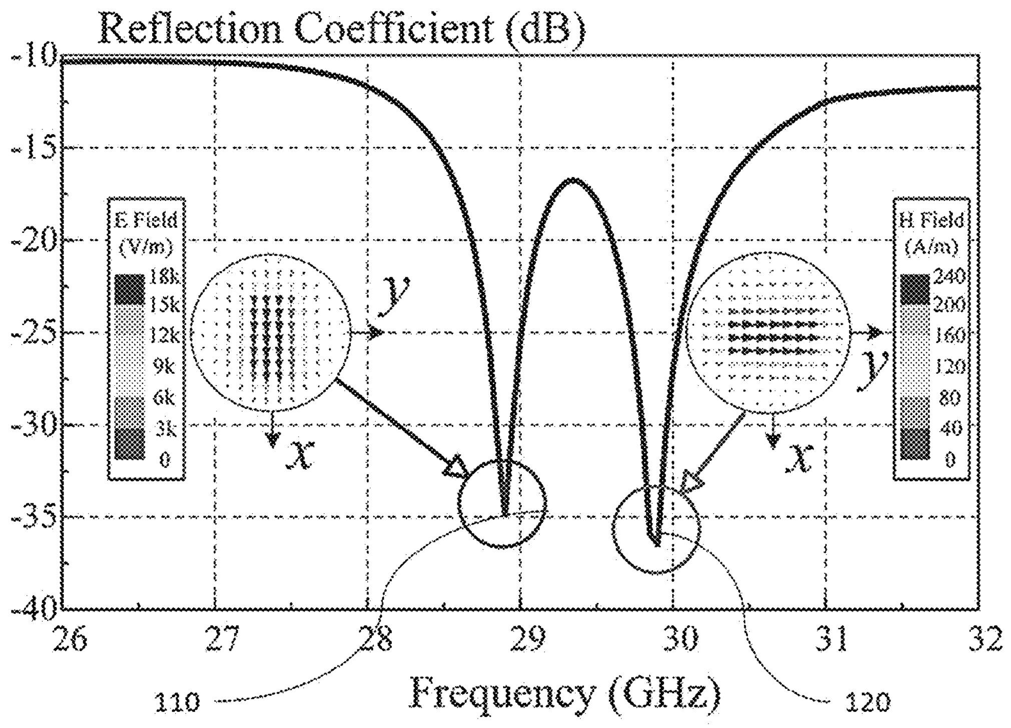
FIG. 1*b* shows a graph demonstrating the resonant points and their field distribution during the Mie Resonance simulation of FIG. 2*a;*

Given the reflection coefficients of the reflection element 101 as shown in FIG. 1*b*, there exist two resonant points, the first resonant point 110 being the electric field resonant point and the second resonant point 12 being the magnetic field resonant point. It can be determined that the first resonant point is the TE01 mode, namely the First Mie Resonance; the second resonant point is the TM01 mode, namely the Second Mie Resonance. When optimizing the cylinder unit 100 with a radius of 1.9 mm and a height of 2.3 mm, the first and second Mie resonant points will be separated, as referenced in FIG. 3. This achieves a −1 dB reflective window from 27.9 GHz to 30.2 GHZ, which implies a 7.9% reflection bandwidth.

To achieve a wider reflective bandwidth and higher efficiency, a second embodiment of the reflection element 101 is provided, with the addition of two arms to the central cylindrical portion along the direction of the electric field, and the width and height of the arm set at 1 mm and 2.5 mm, respectively.

Figure 2A:
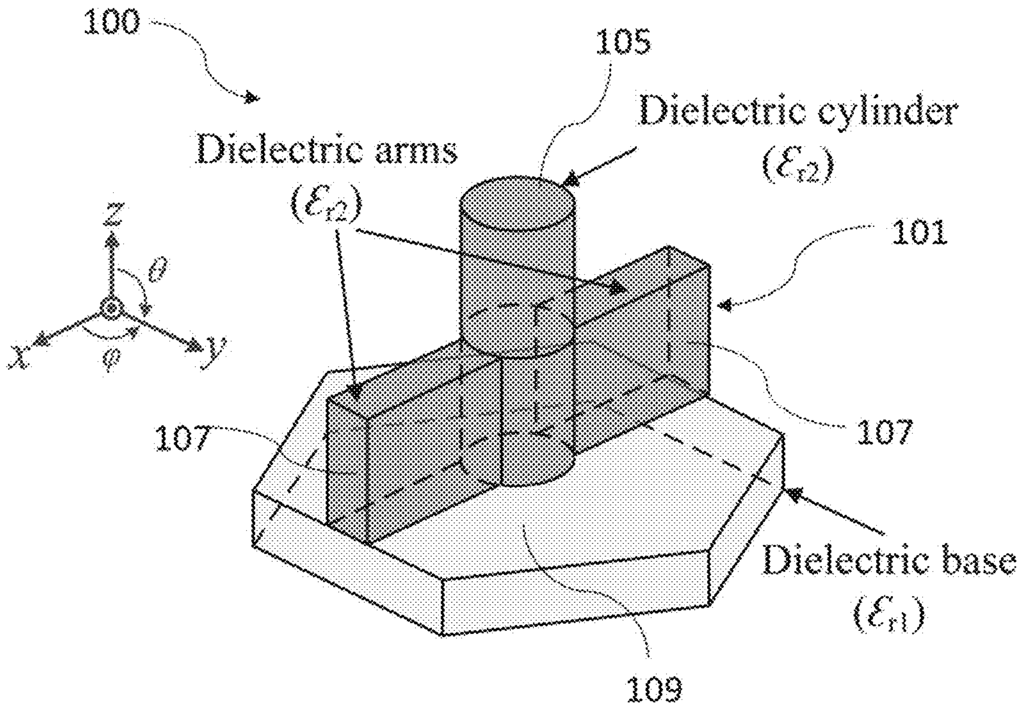
FIG. 2*a* shows a schematic perspective view of an embodiment of an antenna according to the present invention.

In particular, FIG. 2*a* shows a schematic perspective view of an antenna 100 according to the second embodiment of the present invention. The antenna 100 includes a supporting layer 109, on which a reflection element 101 is disposed.

The reflection element 101 further comprises a central portion 150 which in this embodiment is cylindrical in shape, and two arm portions 107 connected with the central portion 105 at the center, on opposite sides of the central portion 105. The two arm portions 107 extend from the central portion 105, along the direction of the electric field and form an angle of 180° with respect to each other. Each of the arm portions 107 have a cuboid or rectangular prism shape, and wherein the end of each of the arm portions 107 is aligned to a central line corresponding to an edge of the supporting layer 109.

In this embodiment, the supporting layer 109 is hexagonal in shape. Alternatively, it may be in other shapes depending on the antenna design. The central portion 105 is positioned at the centre of the supporting layer 109, with both the central portion 105 and the supporting layer 109 aligned on the same central axis. Each of the arm portion 107 is in contact with an edge of the hexagonal shaped supporting layer 109 such that the reflection element 101 as well as the antenna 100 are symmetrical about a centre of rotation.

Both the reflection element 101 and the supporting layer 109 of the antenna 100 are made with ADM. The material for forming the components of the antenna 100 can be chosen with design freedom, as long as the dielectric coefficient $\varepsilon_{r2}$ of the reflection element 101 is larger than the dielectric coefficient $\varepsilon_{r1}$ of the supporting layer 109. In an embodiment, the dielectric coefficient $\varepsilon_{r1}$ of the supporting layer 109 is 3 and the dielectric constant $\varepsilon_{r2}$ of the reflection element is 12.

Figure 2B:
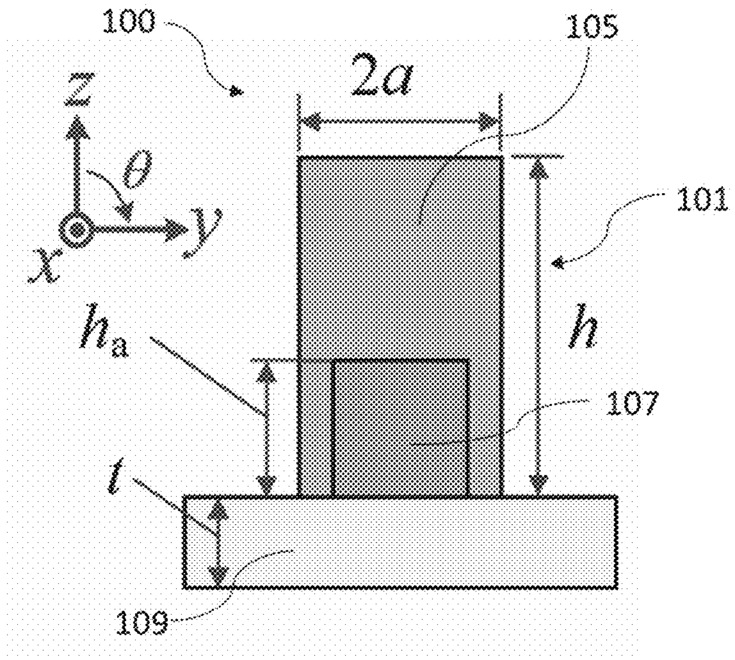
FIG. 2*b* shows a schematic side view of the antenna of FIG. 2*a;*

Referring now to FIG. 2*b* which shows a side view of the antenna 100. The reflection element 101 extends perpendicularly from the supporting layer 109 at a height h. In particular, the central portion 105 has a height h and a radius a, while the arm portion has a height $h_a$. The height $h_a$ of the arm portion 107 is less than half of the height h of the central portion 105, but is larger than the thickness t of the supporting layer 109. In this embodiment, the thickness t of the supporting layer 109 is 0.6 mm.

Figure 2C:
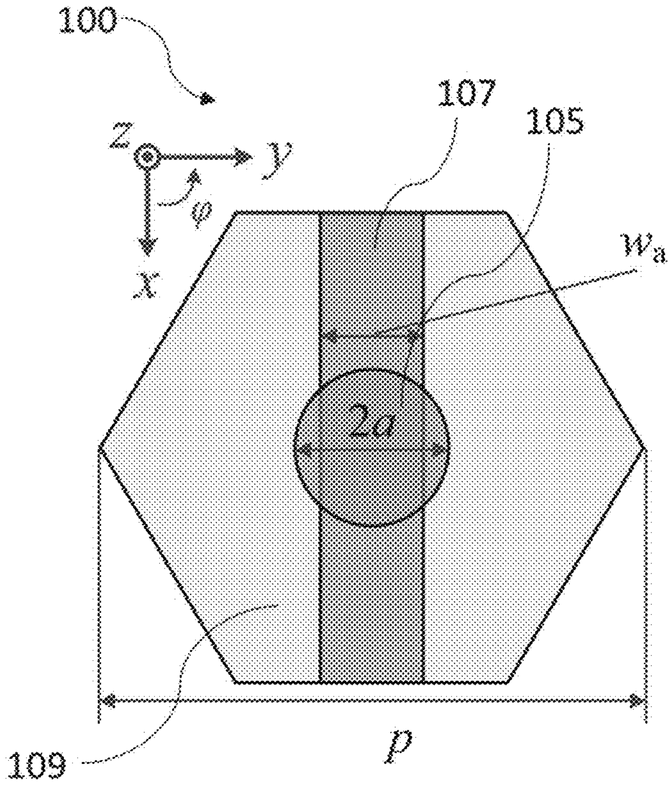
FIG. 2*c* shows a schematic top view of the antenna of FIG. 2*a;*

The arm portion 107 has a width $w_a$ slightly smaller than the diameter 2*a* of the central portion, as shown in FIG. 2*c*. Further, the width $w_a$ is approximately a third of the length of an edge of the hexagonal supporting layer 109, which the arm portion 107 contacts. The diameter 2*a* of the central portion 105 is slightly less than a third of the diagonal length p of the supporting layer 109.

In one specific implementation, the diagonal length p of the hexagonal supporting layer 109 is 10 mm. The height $h_a$ and width a of the arm are 2.5 mm and 1 mm, respectively, and the radius of the cylinder a is 1 mm.

Figure 3:
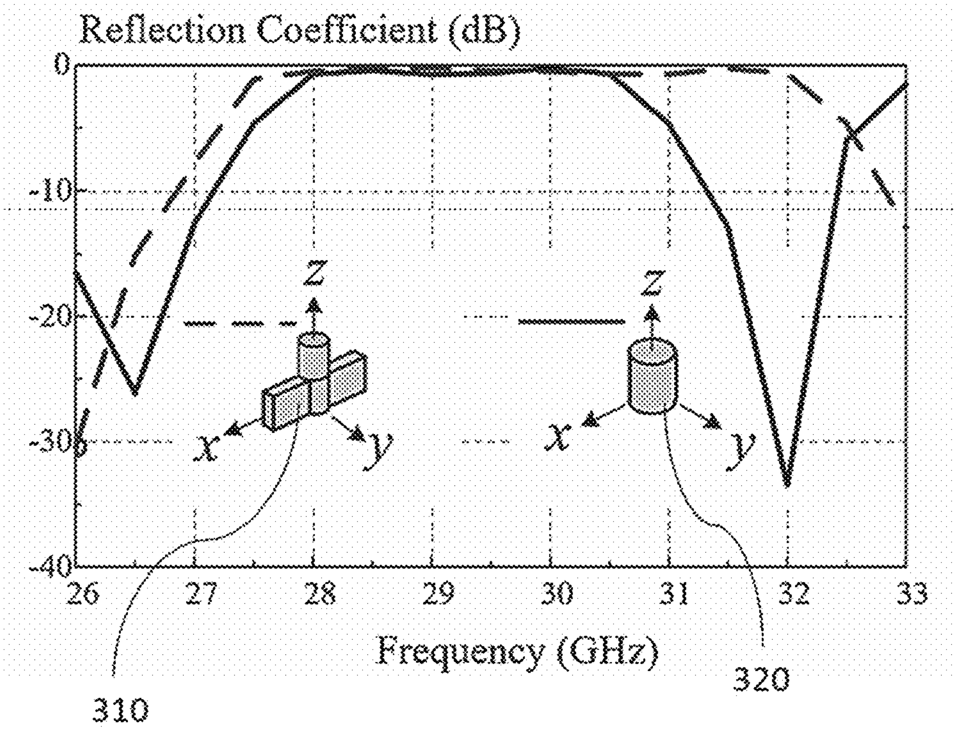
FIG. 3 shows a graph comparing the reflection bandwidth between two embodiments of antennas according to the present invention.

By optimizing the radius a and the height h of the central portion 105, the reflection bandwidth of the antenna 100 can be widened to 15% (27.5~32 GHz). FIG. 3 shows a comparison of reflection bandwidth between a reflection element with the first structure 310 and a reflection element with the second structure 320. The reflection element with the first structure 310 includes a central portion and two arm portions connected to either side of the central portion, while the second structure 320 includes solely a cylinder. It can be shown in FIG. 3 that the reflection element with the first structure 310 has a wider reflection bandwidth than that of the second structure 320.

Figure 4:
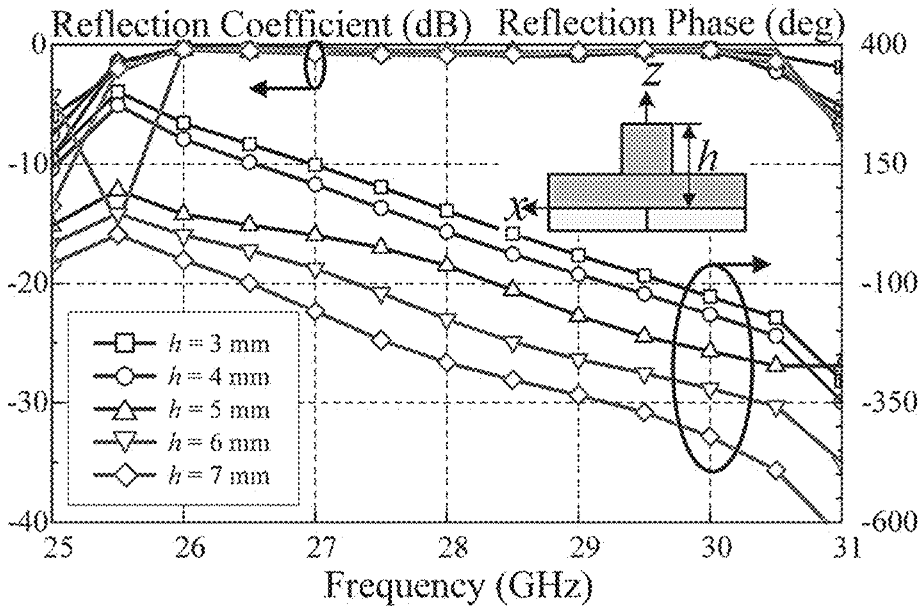
FIG. 4 shows a graph demonstrating the relationship between the height of a reflection unit of an antenna with its reflection phase and coefficient, according to an embodiment of the present invention.

By changing the height h of the reflection element 101 from 3 mm to 7 mm, as demonstrated by FIG. 4, the overlapped −1 dB reflection bandwidth is 15.4% (25.9~30.2 GHz). If identical reflection elements are used to constitute a reflectarray, the distance that the incident wave travels to each unit will be different, since the location of each unit is different; this results in a different reflection phase. Therefore, phase compensation is needed to eliminate the differences in the unit location, after which the reflection phase will be normalized to the same direction and obtain good reflection performance.

Still referring to FIG. 4, it is evident that the reflection phase of the reflectarray changes uniformly with frequency for each change in the height (h) of individual reflection elements.

Figure 5:
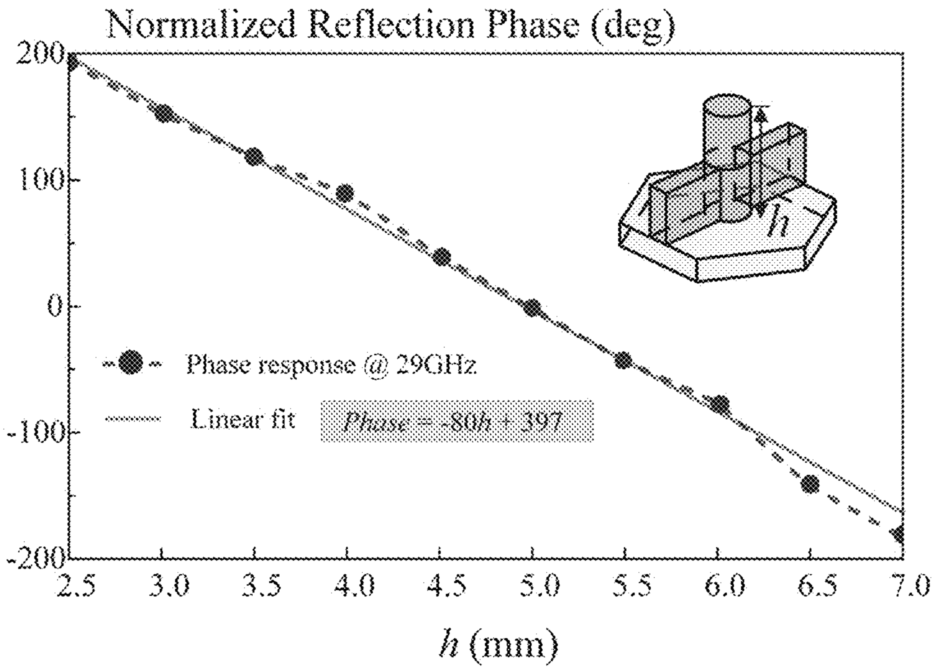
FIG. 5 shows a graph demonstrating the relationship between the normalised reflection phase of a reflection unit of an antenna and its height, according to an embodiment of the present invention.

FIG. 5 demonstrates the relationship between the normalised reflection phase of a reflection unit and its height. The reflection phase can vary and reach or exceed to 360°. The linear fit phase=−80h+397 can be used to construct the reflectarray aperture.

Figure 6:
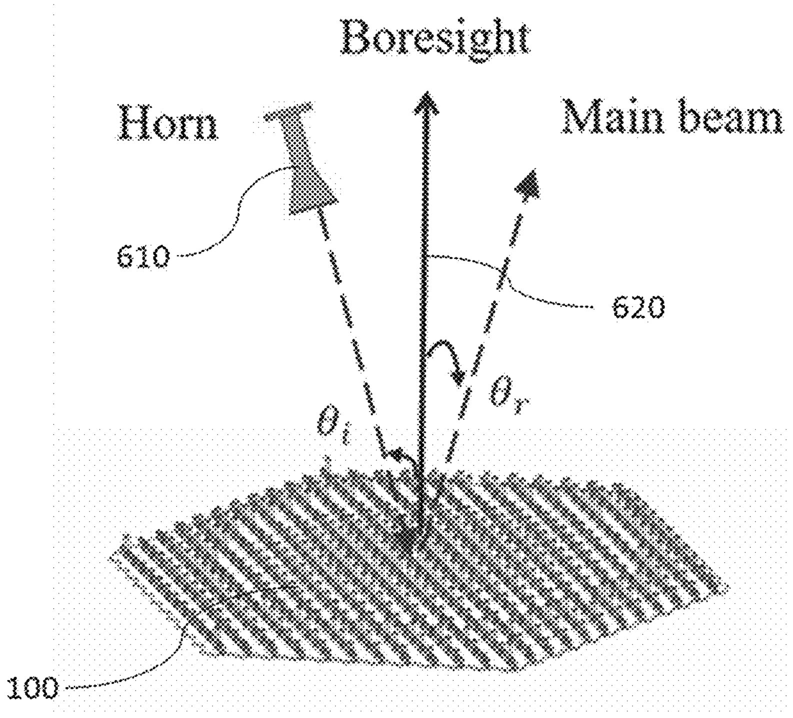
FIG. 6 shows a schematic view of an antenna according to an embodiment of the present invention upon emission by an incident wave.

FIG. 6 shows a schematic view of an antenna 100 according to an embodiment of the present invention upon emission by an incident wave. The incident wave is emitted by a horn 610, and is directed to the antenna 100 at an oblique angle $\theta_i$. In a well-designed reflectarray, all of the reflecting waves should direct to a same direction, thus producing a pencil beam 620.

After obtaining the relationship between the reflection phase and the height of the unit, phase compensation can be obtained by changing the height of the particles. The F/D is usually set to 0.8~1.2. Here, the value of 1 is chosen for the F/D. The phase distribution of a reflectarray can be calculated by the position of the reflection element and the focal length, as equation (1) shows.

$$\phi_c = k \times \left[\sqrt{(F_x - P_x)^2 + (F_y - P_y)^2 = (F_z - P_z)^2} - F_z - P_x \times \sin(\theta_r)\right] + \varphi_0 \tag{1}$$

$$F_x = f \times \sin(\theta_i),\ F_y = 0$$

$$F_z = f \times \cos(\theta_i),\ P_z = h + t$$

where k is the wave number, ($F_x$, $F_y$, $F_z$) is the coordinate of focal point, ($P_x$, $P_y$, $P_z$) is the position of the reflection element. ($P_x$, $P_y$) is the coordinate of the center reflection element, h is the height of the reflection element, t is the thickness of the supporting layer, and $\varphi_0$ is the initial phase reflection of the reflection element. The incident angle is the angle between the reflectarray and the phase center of the feed, and it is set to be symmetric with the main beam, 15°.

Figure 7:
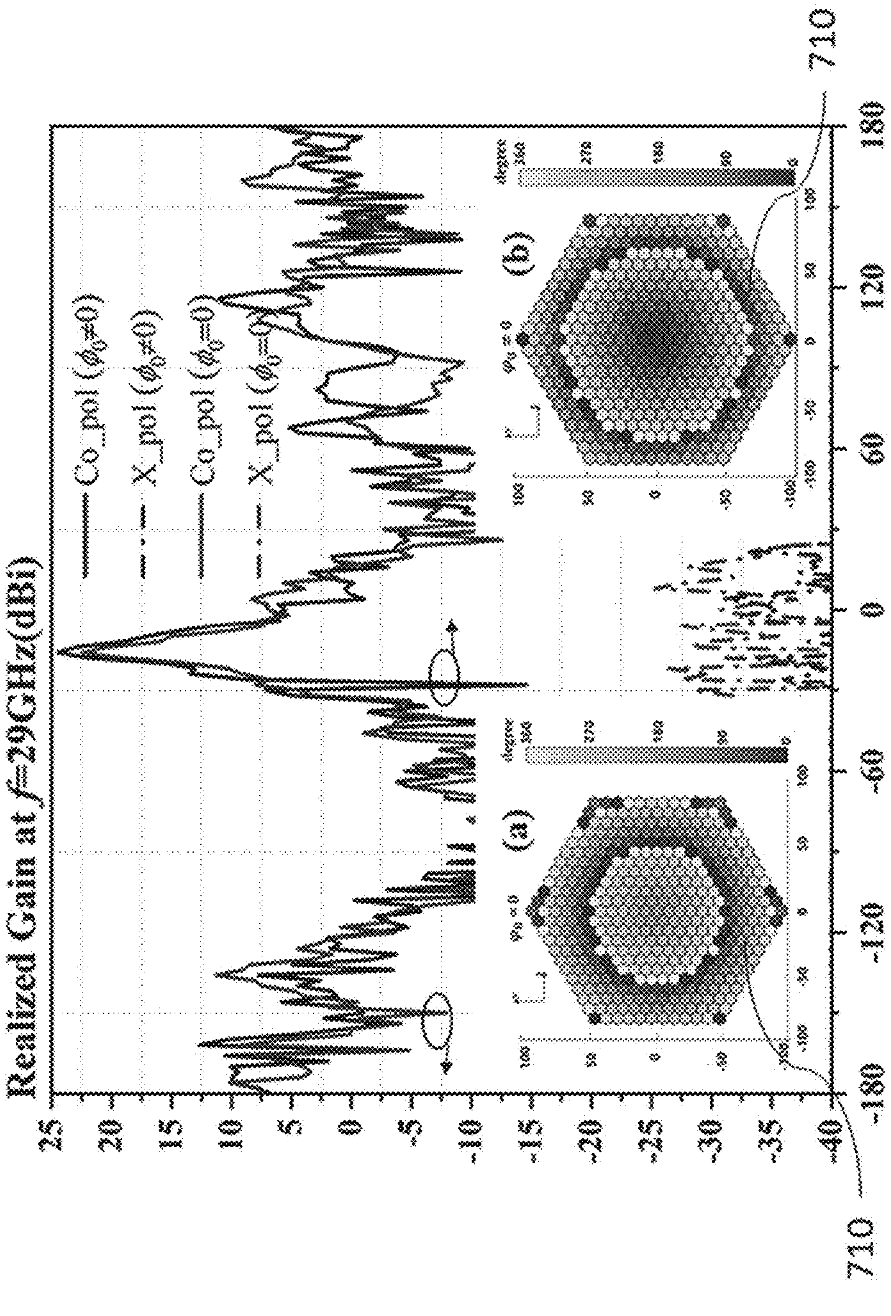
FIG. 7 shows a graph demonstrating the released gain of an embodiment of the reflectarray antenna according to the present invention, at different phase distribution.

According to Equation 1, the phase distribution of the reflectarray can be obtained. If $\varphi_0$=0 at frequency 29 GHz, a reflection phase of each reflection element can be obtained, as demonstrated by FIG. 7. Next, by combining this result with the relationship between the phase and h obtained from FIG. 5, the entire structure of the reflectarray can be modelled, as shown in FIG. 7.

With an incident wave emitted by a standard gain horn, directed to the antenna at an oblique angle of 15°, the antenna performance of the ADM-based reflectarray can be obtained. However, as shown in FIG. 7, the phase compensation of the center of the reflectarray 710 is not zero, which will cause a phase jump from 360° to 0° near the center. To eliminate this phenomenon, it is set that $\varphi_0$=−center phase, wherein the center phase is the phase compensation of the center reflection element. The optimized phase distribution is demonstrated by the reflectarray. It can be seen from FIG. 7 that the realized gain with an optimized φ0 is about 2 dB larger than the version with $\varphi_0$=0, and the simulated realized gain of the former is 24.5 dBi.

In an embodiment, a linearly polarized standard gain feed horn was fabricated and measured. Both its measured and simulated −10 dB impedance bandwidths can generally cover the entire frequency range of interest (26.5-40 GHZ). The realized antenna gain (mismatch included) of the feed horn varies between 13.5 and 16.1 dBi across the frequency range. At 29 GHZ, the antenna gain is 14.7 dBi. The edge taper illuminated by the horn is about −10 dB.

For experiment purpose, an antenna prototype was fabricated and measured. The reflectarray structure was obtained through three-dimensional (3D) printing technology, the reflection elements were made of DK12 material, and the supporting layer was made of DK3 material. To fix the model on the turntable of the system, two fixed platforms were needed for the elevation plane and the azimuth plane, which are the elevation plane and the azimuth plane, respectively. The two platforms were also fabricated by 3D printing technology using PLA material, with a dielectric constant of 2.2. The normalized radiation pattern and antenna gain were tested using a far-field measurement system.

Figure 8A:
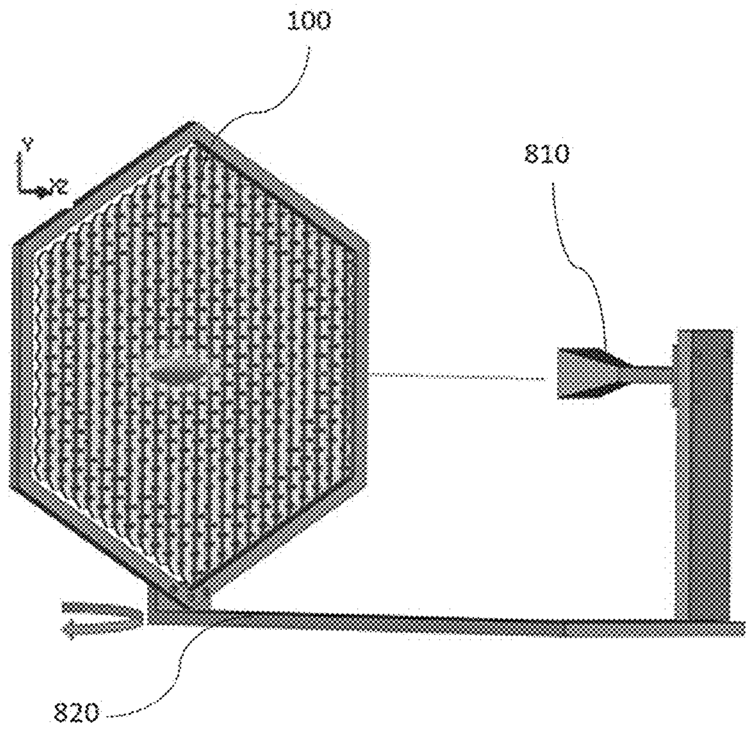
FIG. 8*a* shows a schematic view of an experimental setup with a prototype antenna and a feed horn positioned on an elevation plane according to an embodiment of the present invention.

FIG. 8*a* shows a schematic view of a prototype of the antenna 100 on an elevation plane. With the turning table rotating 820 at the xoz plane, the elevation plane could be scanned, and the main beam of the elevation plane was at the 15° direction. However, the turning table 820 cannot rotate in the azimuth plane due to the limitations of the equipment.

Figure 8B:
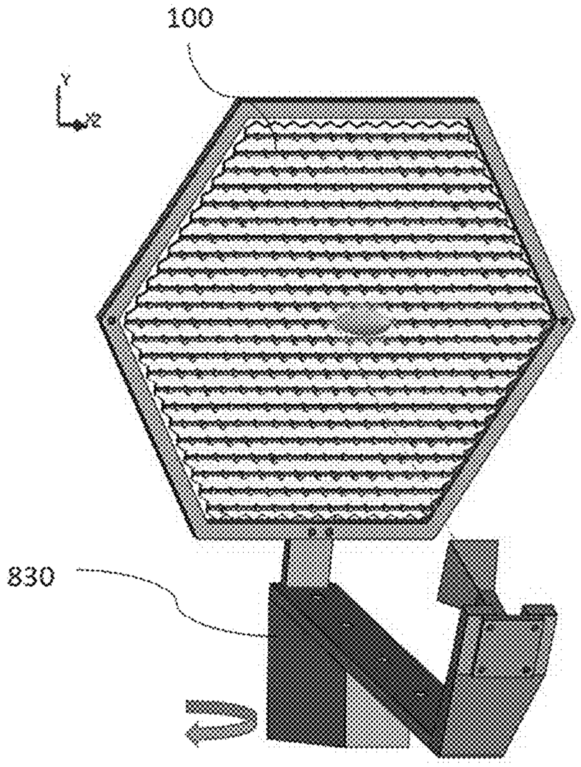
FIG. 8*b* shows a schematic view of an experimental setup with a prototype antenna and a feed horn positioned on an azimuth plane according to an embodiment of the present invention.

When rotating the model 90° on the xoz plane to measure the radiation pattern of the azimuth plane, as in the traditional test method, it is found that the result was incorrect. The reason for this is that the radiated wave was not in the azimuth plane in this circumstance. To measure the azimuth plane radiation pattern, another support platform 830 is designed, which is shown in FIG. 8*b*. With the structure of a wedge, the main beam can appear in the 0° direction, so when rotating the turntable 830, the main beam can be scanned.

Figure 9A:
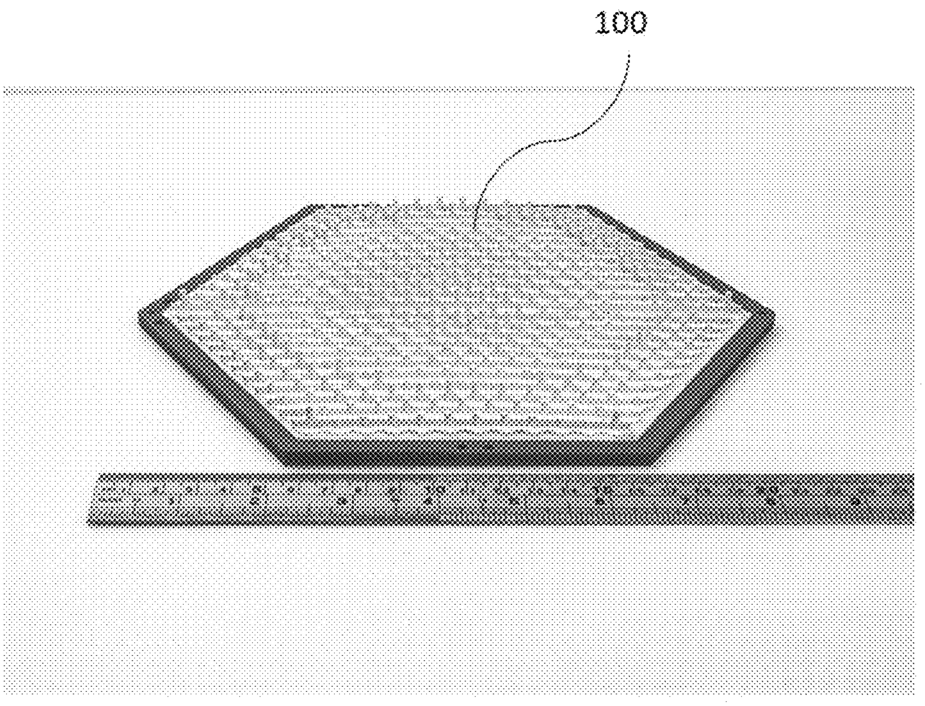
FIG. 9*a* shows an optical image of an embodiment of an antenna according to the present invention.
Figure 9B:
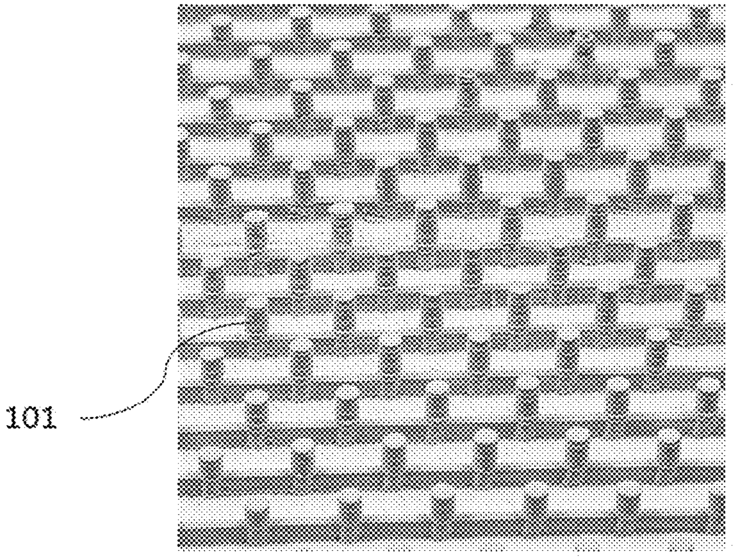
FIG. 9*b* shows a close-up view of the antenna of FIG. 9*a*, displaying the reflection units in detail.
Figure 10:
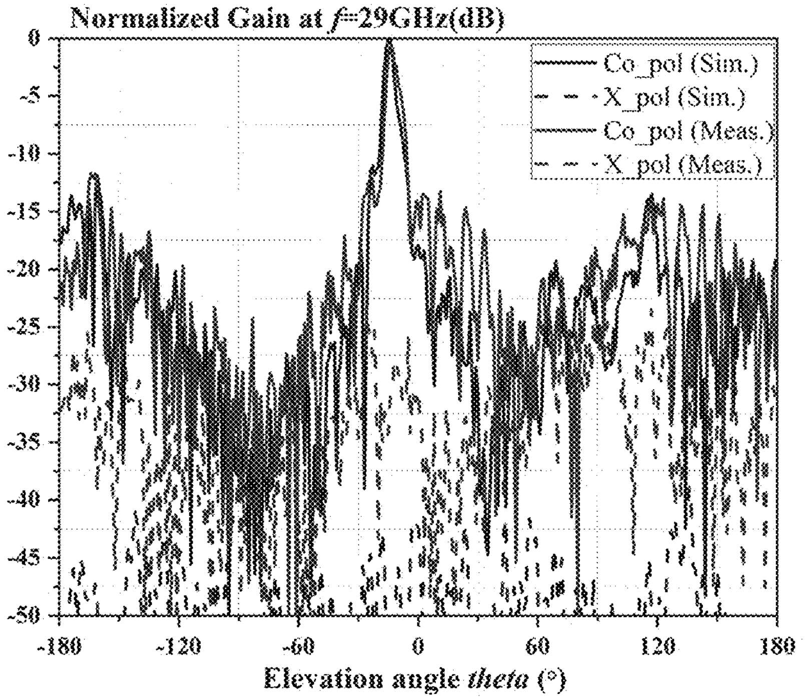
FIG. 10 shows a graph of the co- and cross-polarization radiation patterns at 29 GHz in an elevation plane.
Figure 11:
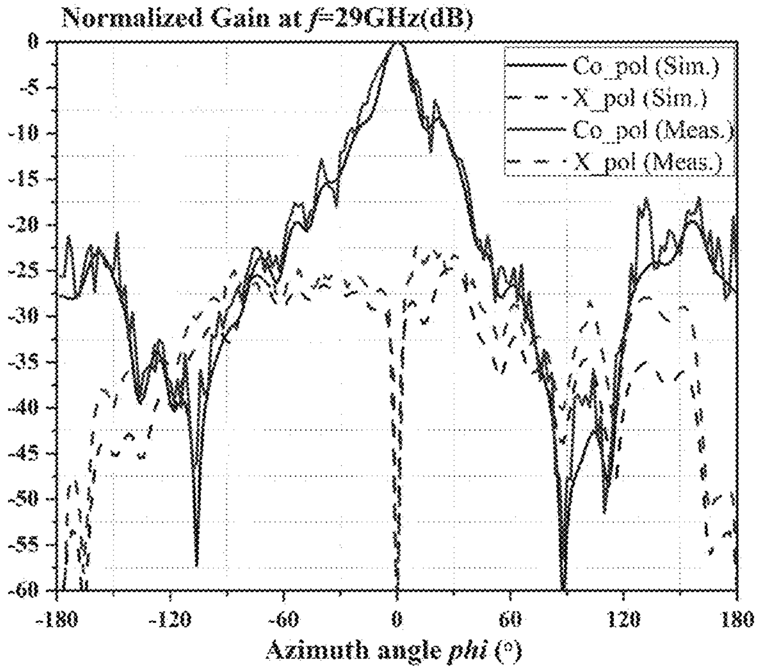
FIG. 11 shows a graph of the co- and cross-polarization radiation patterns at 29 GHz in an azimuth plane.

FIG. 9*a* shows an optical image of an embodiment of an antenna 100, while FIG. 9*b* shows a close-up of the antenna 100, displaying individual reflection elements 101 in detail. The plurality of reflection elements are lined up in an array on the supporting layer to form a reflectarray panel, with the arm portions of the adjacent reflection elements 101 in contact with each other FIGS. 10 and 11 show the simulated and measured normalized gain of the reflectarray at the elevation plane and the azimuth plane. The measured main beam is along the direction of −14°, which is 1° smaller than the simulated angle (−15° due to the alignment error of the measurement system. At the elevation plane, the measured side lobe level (SLL) and the back lobe level (BLL) are below −12.5 and −12 dB, respectively, which has good agreement with the simulated −12 and −13 dB results. In the azimuth plane, the measured back lobe level (BLL) is below −20 dB, which has good agreement with the simulated −23 dB result. Further, the measured and simulated cross polarizations are both below −20 dB in both planes, indicating that the reflectarray has a good polarization isolation performance at 29 GHz. The measurement difference at the elevation plane and the azimuth plane are due to the alignment error and the 3-D printing precision error.

Figure 12:
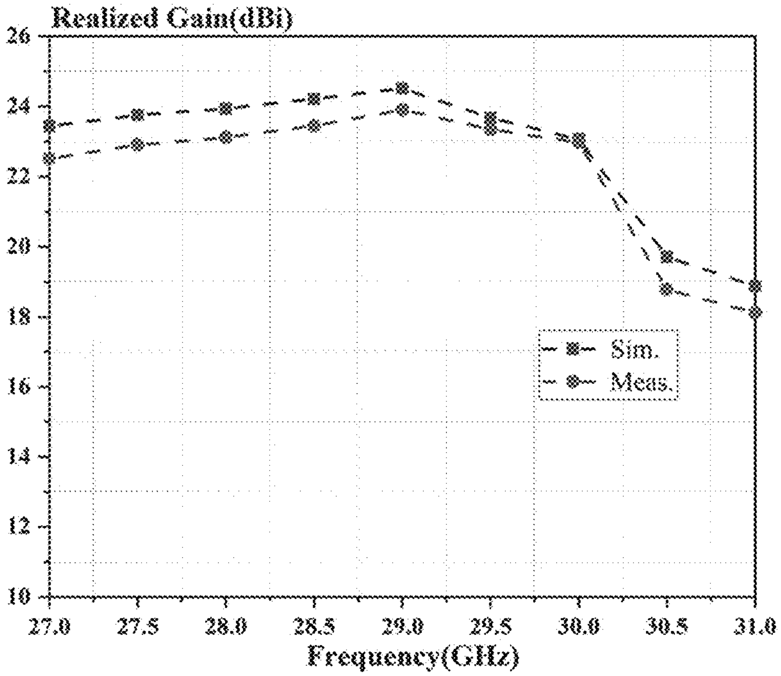
FIG. 12 shows a graph demonstrating the measured and simulated realised gain of an antenna according to an embodiment of the present invention.

FIG. 12 shows the measured and simulated realized gains at 29 GHz. It can be found that the measured maximum realized gain is 23.8 dBi, which is 0.7 dBi less than the simulated gain. The measured and simulated 1 dB reflection bandwidths are 10.5% (27~30 GHz) and 10.6% (26.8~29.8 GHZ). All the measurement results are well agreed with the simulated results.

In summary, exemplary embodiments of the present invention provide an ADM-based reflectarray antenna with a simple structure operable in Ka-band. The reflectarray unit antenna is a two-arm cylinder with a dielectric constant of 12. Compared with traditional dielectric reflectarrays that use a full metal ground, the present invention achieves phase adjusting by changing the height of the unit while maintaining broadband reflection. From the Mie resonant principle, through reasonable selection parameters, the electrical and magnetic resonant points will be separated, which will create a reflective window. In this way, a reflectarray with good performance can be achieved by using a single layer dielectric with a simple unit structure. A hexagonal prototype with the size of 19 cm*12 cm was designed, fabricated, and tested. The measured radiation patterns confirm that the antenna has a high performance with a 23.8 dBi peak realized gain and a 10.5% (27~30 GHz) 1 dB reflection.

While the embodiments have been illustrated and described in detail in the foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

The invention claimed is:

1. An antenna, comprising:

(i) a supporting layer, and (ii) a reflection element disposed on the supporting layer, configured to reflect an incident wave with a respective reflection phase, wherein the reflection element extends perpendicularly from the supporting layer at a height configured to achieve the respective reflection phase, and wherein both the supporting layer and the reflection element is formed with an all-dielectric material.

2. The antenna according to claim 1, wherein the supporting layer has a first dielectric constant and the reflection element has a second dielectric constant, and wherein the second dielectric constant is higher than the first dielectric constant.

3. The antenna according to claim 1, wherein the reflection element is a single-layer structure.

4. The antenna according to claim 1, wherein the reflection element further comprising:

(i) a central portion and (ii) two arm portions attached to either side of the central portion, wherein the arm portions form an angle of 180° with respect to each other.

5. The antenna according to claim 4, wherein the central portion has a first height and each of the arm portions has a second height, and wherein the second height is less than half of the first height.

6. The antenna according to claim 5, wherein the first height ranges between 3 mm and 7 mm.

7. The antenna according to claim 5, wherein the second height is 2.5 mm.

8. The antenna according to claim 4, wherein the central portion is aligned with the supporting layer on a same central axis.

9. The antenna according to claim 4, each of the arm portions extends from the central portion along a direction of an electric field.

10. The antenna according to claim 4, wherein the central portion is cylindrical in shape.

11. The antenna according to claim 10, wherein each of the arm portions has a width less than a diameter of the central portion.

12. The antenna according to claim 10, wherein the central portion has a radius of 2.15 mm.

13. The antenna according to claim 4, wherein the supporting layer is hexagonal in shape.

14. The antenna according to claim 13, wherein each of the arm portions is aligned with an edge of the supporting layer.

15. The antenna according to claim 14, wherein each of the arm portions has a width about one-third of the edge of the support layer.

16. The antenna according to claim 15, wherein the width of each of the arm portions is 1 mm.

17. The antenna according to claim 13, wherein the supporting layer has a diagonal length of 10 mm.

18. The antenna according to claim 4, wherein the antenna is symmetrical about a centre of rotation.

19. The antenna according to claim 1, wherein the antenna is configured to operate within a reflection bandwidth defined by a separation between a magnetic wave resonant frequency and an electromagnetic wave resonant frequency.

20. The antenna according to claim 19, wherein the reflection bandwidth is determined by a width of the reflection element.

21. The antenna according to claim 19, wherein the reflection bandwidth is determined by the height of the reflection element.

22. The antenna according to claim 1, wherein the antenna is formed by three-dimensional printing technology.

23. The antenna according to claim 1, wherein the antenna is configured to operate within Ka frequency band or THz frequency band.

24. The antenna according to claim 1, comprising a plurality of reflection elements arranged in an array on the supporting layer, wherein the plurality of reflection elements are configured to collectively form a predetermined phase distribution profile that reflects the incident wave in a predetermined direction.

* * * * *